(12) United States Patent
Takijiri et al.

(10) Patent No.: US 12,315,872 B2
(45) Date of Patent: May 27, 2025

(54) NON-AQUEOUS ELECTROLYTE SECONDARY BATTERY

(71) Applicant: Panasonic Intellectual Property Management Co., Ltd., Osaka (JP)

(72) Inventors: Manabu Takijiri, Osaka (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 569 days.

(21) Appl. No.: 17/636,593

(22) PCT Filed: Jul. 28, 2020

(86) PCT No.: PCT/JP2020/028818
§ 371 (c)(1),
(2) Date: Feb. 18, 2022

(87) PCT Pub. No.: WO2021/039240
PCT Pub. Date: Mar. 4, 2021

(65) Prior Publication Data
US 2022/0311045 A1 Sep. 29, 2022

(30) Foreign Application Priority Data

Aug. 30, 2019 (JP) ................................. 2019-158487
Sep. 4, 2019 (JP) ................................. 2019-161310

(51) Int. Cl.
*H01M 10/0525* (2010.01)
*H01M 4/525* (2010.01)
(Continued)

(52) U.S. Cl.
CPC ....... *H01M 10/0525* (2013.01); *H01M 4/525* (2013.01); *H01M 4/583* (2013.01);
(Continued)

(58) Field of Classification Search
CPC ......... H01M 10/0525; H01M 10/0568; H01M 4/525; H01M 4/583; H01M 2004/021;
(Continued)

(56) References Cited

U.S. PATENT DOCUMENTS

2013/0330616 A1  12/2013  Christensen
2019/0386322 A1  12/2019  Yawata et al.

FOREIGN PATENT DOCUMENTS

JP    2001-216965 A    8/2001
JP    2011-165388 A    8/2011
(Continued)

OTHER PUBLICATIONS

International Search Report dated Oct. 13, 2020, issued in counterpart International Application No. PCT/ JP2020/028818 (2 pages).
(Continued)

*Primary Examiner* — Jane J Rhee
(74) *Attorney, Agent, or Firm* — WHDA, LLP

(57) ABSTRACT

In this non-aqueous electrolyte secondary battery, a positive electrode includes a lithium transition metal composite oxide that contains Ni at 85 mol % or more with respect to the total number of moles of metal elements excluding Li, and a negative electrode includes graphite particles having an internal porosity of 1-5%. The N/P ratio is 1.00-1.05, where P is the charging capacity of the positive electrode, and N is the charging capacity of the negative electrode.

4 Claims, 3 Drawing Sheets

(51) Int. Cl.
  *H01M 4/583* (2010.01)
  *H01M 10/0568* (2010.01)
  *H01M 4/02* (2006.01)
(52) U.S. Cl.
  CPC .. *H01M 10/0568* (2013.01); *H01M 2004/021* (2013.01); *H01M 2004/027* (2013.01); *H01M 2004/028* (2013.01); *H01M 2300/0037* (2013.01)
(58) Field of Classification Search
  CPC ..... H01M 2004/027; H01M 2004/028; H01M 2300/0037
  See application file for complete search history.

(56) References Cited

FOREIGN PATENT DOCUMENTS

| | | |
|---|---|---|
| JP | 6063397 B2 | 1/2017 |
| JP | 2019-33074 A | 2/2019 |
| WO | 2018/168505 A1 | 9/2018 |

OTHER PUBLICATIONS

Li Jing et al: "Dependence of Cell Failure on Cut-off Voltage Ranges and Observation of Kinetic Hindrance in LiNi0.8Co0.15Al0.05O2", Journal of the Electrochemical Society, vol. 165, No. 11, Aug. 23, 2018 (Aug. 23, 2018), pp. A2682-A2695, XP055946764; Cited in Extended European Search Report dated Oct. 25, 2022. (14 pages).

Zheng Jianming et al: "Lattice Mn3+Behaviors in Li4Ti 5O12/LiNi0.5Mn1.5O4 Full Cells", Journal of the Electrochemical Society, vol. 160, No. 8, May 28, 2013 (May 28, 2013), pp. A1264-AI268, XP055969690; Cited in Extended European Search Report dated Oct. 25, 2022. (6 pages).

Becker Dina et al: "Surface Modification of Ni-Rich LiNi0.8Co0.1Mn0.1O2 Cathode Material by Tungsten Oxide Coating for Improved Electrochemical Performance in Lithium-Ion Batteries", Applied Materials & Interfaces, vol. 11, No. 20, May 22, 2019 (May 22, 2019), pp. 18404-18414, XP055822117; Cited in Extended European Search Report dated Oct. 25, 2022. (11 pages).

Becker Dina et al: S-1 Supporting Information "Surface Modification of Ni-rich LiNi0.8Co0.1Mn0.1O2 Cathode Material by Tungsten Oxide Coating for Improved Electrochemical Performance in Lithium-Ion Batteries", May 22, 2019 (May 22, 2019), pp. 1-7, XP055970121; Cited in Extended European Search Report dated Oct. 25, 2022. (7 pages).

Noh Hyung-Joo et al: "Comparison of the structural and electrochemical properties of layered Li[NixCoyMnz]O2(x= 1/3, 0.5, 0.6, 0.7, 0.8 and 0.85) cathode material for lithium-ion batteries", Journal of Power Sources, Elsevier, Amsterdam, NL, vol. 233, Jan. 19, 2013 (Jan. 19, 2013), pp. 121-130, XP028997672; Cited in Extended European Search Report dated Oct. 25, 2022. (10 pages).

Jansen Andy et al: "Low Cost Components: Screening of Advanced Battery Materials", Feb. 26, 2008 (Feb. 26, 2008), pp. 1-20, XP055970146, Retrieved from the Internet: <URL:https://www1.eere.energy.gov/vehiclesandfuels/pdfs/merit_review_2008/applied_battery/merit08_jansen_I.pdf> [retrieved on Oct. 11, 2022]; Cited in Extended European Search Report dated Oct. 25, 2022. (20 pages).

The Extended European Search Report dated Oct. 25, 2022, issued in counterpart to EP Application No. 20858883.0. (13 pages).

NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/028818 filed on Jul. 28, 2020 which claims the benefit of priorities under 35 U.S.C. § 119 (a) of Japanese Patent Applications No. 2019-158487 filed in Japan on Aug. 30, 2019 and No. 2019-161310 filed in Japan on Sep. 4, 2019, the contents of which are incorporated herein by reference.

TECHNICAL FIELD

The present disclosure generally relates to a non-aqueous electrolyte secondary battery, and in particular, to a non-aqueous electrolyte secondary battery using a lithium-transition metal composite oxide with a high Ni content as a positive electrode active material.

BACKGROUND ART

In recent years, a lithium-transition metal composite oxide with a high Ni content has attracted attention as a positive electrode active material with a high energy density. Patent Literature 1, for example, discloses a non-aqueous electrolyte secondary battery using a lithium-nickel composite oxide represented by the general formula $LiNi_xCo_yAl_zO_2$ (x+y+z=1, 0.05≤y≤0.4, and 0.01≤z≤0.09) with a layered rock-salt structure as a positive electrode active material, wherein the active material density in a positive electrode is 2.3 to 3.0 g/cm$^3$.

CITATION LIST

Patent Literature

PATENT LITERATURE 1: Japanese Unexamined Patent Application Publication No. 2001-216965

SUMMARY

Using a lithium-transition metal composite oxide with a high Ni content for a positive electrode active material causes more Li to be extracted during charge than a composite oxide with a low Ni content to destabilize the layered structure of the composite oxide, and a battery capacity is likely to be lowered associated with charging and discharging. The art disclosed in Patent Literature 1 cannot sufficiently inhibit the structure deterioration of the composite oxide due to the Li extraction, and has still a room for improvement in charge-discharge cycle characteristics (durability).

An object of the present disclosure is to improve charge-discharge cycle characteristics in a non-aqueous electrolyte secondary battery using a lithium-transition metal composite oxide with a high Ni content as a positive electrode active material.

A non-aqueous electrolyte secondary battery of an aspect of the present disclosure comprises: a positive electrode; a negative electrode; and a non-aqueous electrolyte, wherein the positive electrode includes a lithium-transition metal composite oxide containing 85 mol % or more of Ni based on a total number of moles of metal elements excluding Li; the negative electrode includes graphite particles having an internal void ratio of 1 to 5%; an N/P ratio is 1.00 to 1.05 where P represents a charge capacity of the positive electrode and N represents a charge capacity of the negative electrode; and a maximum amount of change (dQ/dV (cf)) in a battery capacity (Q) within a voltage range from a battery voltage of 4.0 V to a charge termination voltage and a maximum amount of change (dQ/dV (cm)) in a battery capacity (Q) within a voltage range of a battery voltage from 3.8 V to 4.0 V satisfy a relation of Formula 1.

$$dQ/dV\ (\mathrm{cf})/dQ/dV\ (\mathrm{cm}) \leq 1 \quad [\text{Formula 1}]$$

According to an aspect of the present disclosure, lowering in capacity associated with charging and discharging in the non-aqueous electrolyte secondary battery using the lithium-transition metal composite oxide with a high Ni content can be inhibited. The non-aqueous electrolyte secondary battery according to the present disclosure has a high energy density and excellent cycle characteristics (durability).

DESCRIPTION OF EMBODIMENTS

As described above, a lithium-transition metal composite oxide with a high Ni content contributes to improvement in an energy density of a battery, but extracts much Li during charge to collapse and destabilize the layered structure of the composite oxide due to repeated charge and discharge, which is presumed to cause lowering in battery capacity (durability). Lowering a charge termination voltage is considered to be a method for inhibiting the deterioration of the composite oxide. Unfortunately, the negative electrode is deteriorated to become a problem in this case, and the battery durability is not sufficiently improved.

The present inventors have made intensive investigation to solve the above problem, and as a result, have found that the battery durability is remarkably improved by: using graphite particles having an internal void ratio of 1 to 5% as a negative electrode active material; setting a ratio of P, a charge capacity of the positive electrode, and N, a charge capacity of the negative electrode, to be 1.00 to 1.05; and satisfying the above condition of Formula 1. Hereinafter, an example of an embodiment of the non-aqueous electrolyte secondary battery according to the present disclosure will be described in detail.

Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween. The description "a numerical value (A) to a numerical value (B)" herein means the numerical value (A) or more and the numerical value (B) or less.

Figure 1:
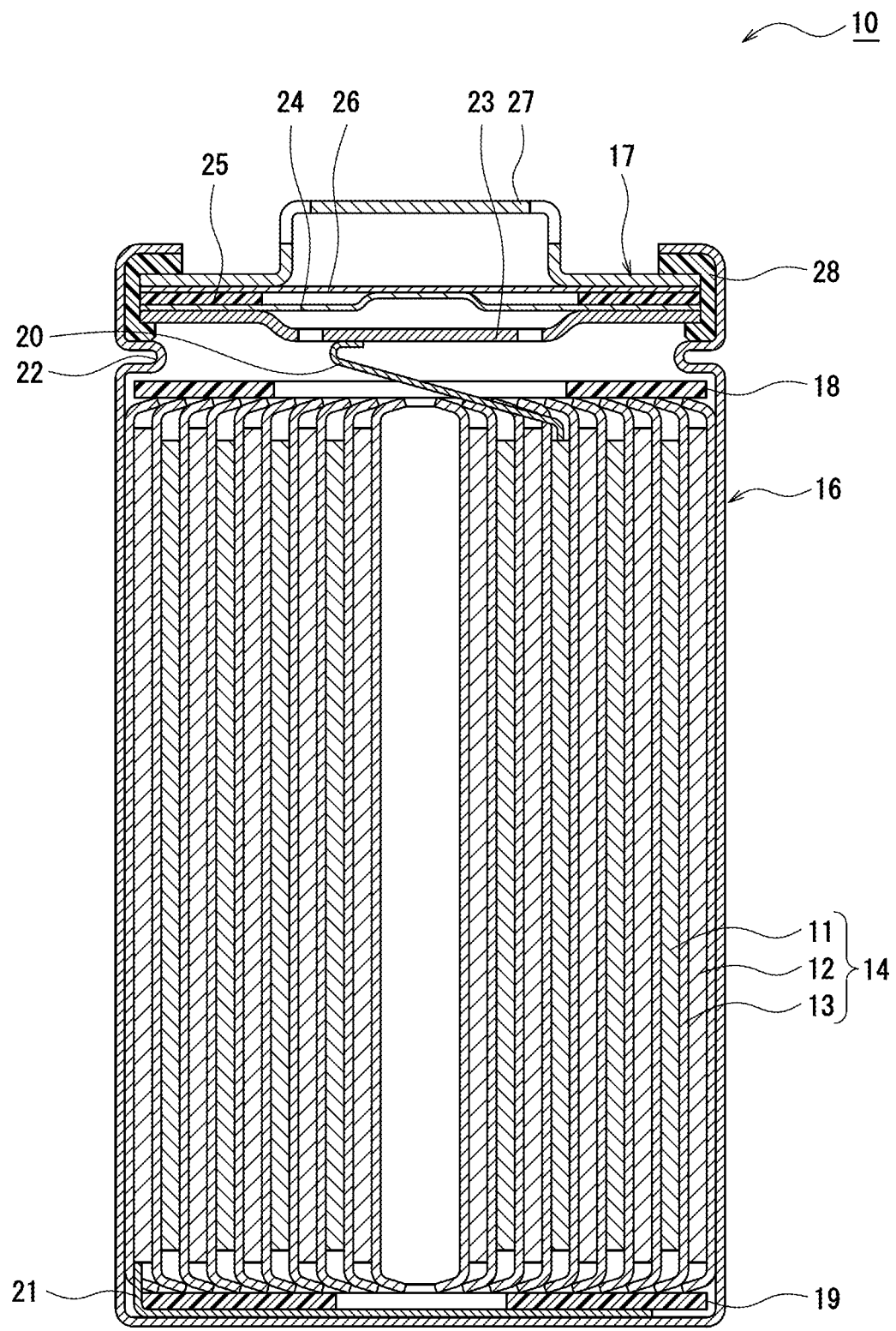
FIG. 1 is a cross sectional view of a non-aqueous electrolyte secondary battery of an example of an embodiment.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly a positive electrode active material constituting the positive electrode 11 and a negative electrode active material constituting the negative electrode 12, will be described in detail. A charging control of the battery will also be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core, drying and subsequently compressing the applied film to form the positive electrode mixture layers on both the surfaces of the positive electrode core.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode 11 includes a lithium-transition metal composite oxide containing 85 mol % or more of Ni based on a total number of moles of metal elements excluding Li. Hereinafter, for convenience of description, the lithium-transition metal composite oxide is referred to as "composite oxide (Z)". The composite oxide (Z) functions as the positive electrode active material. The composite oxide (Z) has a layered structure, and for example, has a layered structure belonging to the space group R-3m or a layered structure belonging to the space group C2/m. The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

As described above, the composite oxide (Z) contains 85 mol % or more of Ni based on the total number of moles of metal elements excluding Li. A Ni content of 85 mol % or more may yield a battery having a high energy density. The Ni content may be 86 mol % or more, or may be 90 mol % or more, based on the total number of moles of metal elements excluding Li. An upper limit of the Ni content is not particularly limited, but preferably 97 mol %, and more preferably 95 mol %, based on the total number of moles of metal elements excluding Li.

The composite oxide (Z) may contain a metal element other than Li and Ni. Example of the metal element may include Co, M, Al, Zr, B, Mg, Fe, Cu, Zn, Sn, Na, K, Ba, Sr, Ca, W, Mo, Si, Nb, and Sr. The composite oxide (Z) preferably contains at least Al in addition to Li and Ni, and more preferably further contains at least one selected from the group consisting of Mn and Nb. Al, which does not change its oxidation number during charge and discharge, stabilizes the layered structure of the composite oxide (Z). Nb also stabilizes the layered structure of the composite oxide (Z) to contribute to the improvement in the battery durability.

When the composite oxide (Z) contains Al, an Al content is preferably 0.5 to 8.0 mol %, and more preferably 1.0 to 5.0 mol %, based on the total number of moles of metal elements excluding Li. When the composite oxide (Z) contains Mn, a Mn content is preferably 10 mol % or less based on the total number of moles of metal elements excluding Li. When the composite oxide (Z) contains Nb, a Nb content is preferably 1.0 mol % or less based on the total number of moles of metal elements excluding Li. The composite oxide (Z) may contain Co. A Co content is preferably 10 mol % or less, and may be 3 mol % or less, based on the total number of moles of transition metal elements.

A preferable example of the composite oxide (Z) is a composite oxide represented by the general formula $Li_aNi_bCo_cAl_dMn_eNb_fO_g$ (in the formula, $0.8 \leq a \leq 1.2$, $0.85 \leq b < 1$, $0 \leq c \leq 0.03$, $0 \leq d \leq 0.08$, $0 \leq e \leq 0.10$, $0 \leq f \leq 0.01$, and $1 \leq g \leq 2$). Contents of the elements constituting the composite oxide (Z) may be measured with an inductively coupled plasma atomic emission spectroscopy analyzer (ICP-AES), an electron probe micro analyzer (EPMA), an energy dispersive X-ray analyzer (EDX), or the like.

The composite oxide (Z) is, for example, a secondary particle formed by aggregation of primary particles. The particle diameter of the primary particles is typically 0.05 µm to 1 µm. The median diameter (D50) on a volumetric basis of the composite oxide (Z) is, for example, 3 µm to 30 µm, and preferably 5 µm to 25 µm. The D50, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layers on both the surfaces of the negative electrode core.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof polyvinyl alcohol (PVA), and the like. Among them, SBR, and CMC or a salt thereof, or PAA or a salt thereof are preferably used in combination.

The negative electrode 12 includes graphite particles having an internal void ratio of 1 to 5%. Hereinafter, for convenience of description, the graphite particle is referred to as "graphite particle (G)". The graphite particle (G) functions as the negative electrode active material. The internal void means a closed void not connected to a particle surface from the particle inside, and distinguished from an outer void, which is connected to a particle surface from the particle inside. The negative electrode active material is mainly composed of the graphite particles (G), and may be composed of substantially only the graphite particles (G). The negative electrode active material may include graphite particles having an internal void ratio of less than 1% or more than 5%, or a compound other than graphite such as a Si-containing compound within a range in that an object of the present disclosure is not impaired.

The graphite particle (G) may be any of a natural graphite and an artificial graphite, but is preferably an artificial graphite from a viewpoint of regulating the internal void ratio. A D50 of the graphite particle 30 is, for example, 5 µm to 30 µm, and preferably 10 µm to 25 µm. The D50 is measured in the same manner as the D50 of the composite oxide (Z).

The internal void ratio of the graphite particle (G) is, as described above, 1 to 5%, more preferably 1.5% to 4.5%, and even more preferably 2.0 to 4.0%. Using the graphite particles having the internal void ratio within the above range inhibits a material deterioration of the positive and negative electrodes associated with charging and discharging. The negative electrode 12 includes graphite particles having a particle diameter (diameter of a circumscribed circle of the particle in a scanning electron microscope (SEM) image) of 5 μm to 50 μm, and 50% or more, preferably 80% or more, or substantially all of the particles has the internal void ratio of 1 to 5%. In other words, at least 50% of the graphite particles included in the negative electrode 12 and having a particle diameter of 5 μm to 50 μm is the graphite particle (G).

The internal void ratio of the graphite particle herein means a rate of an area of an internal void of the graphite particle to a sectional area of the graphite particle. A measuring method of the internal void ratio of the graphite particle is as follows.

(1) A cross section of the negative electrode mixture layer is exposed by using an ion milling apparatus (for example, IM4000PLUS, manufactured by Hitachi High-Tech Corporation) or the like.

(2) A backscattered electron image of the exposed cross section of the negative electrode mixture layer is photographed by using a scanning electron microscope (SEM). A magnification when photographing the backscattered electron image is 3000 to 5000-fold.

(3) The SEM image of the cross section of the negative electrode mixture layer is input to a computer, and binarized by using an image analyzing software (for example, ImageJ, manufactured by National Institutes of Health) to obtain a binarized image in which a cross section of the particles in the sectional image is converted to be black and a void present on the particle cross section is converted to be white.

(4) Graphite particles having a particle diameter of 5 μm to 50 μm are selected from the binarized image to calculate a sectional area of the graphite particles and an area of the internal void present on the cross section of the graphite particle.

A void having a width of 3 μm or smaller among the voids present on the cross section of the graphite particle is sometimes difficult to determine, on the image analysis, whether it is the internal void or the outer void. Thus, the void having a width of 3 μm or smaller may be determined as the internal void. The internal void ratio of the graphite particle is an average value of rates of 10 particles.

Of the graphite particle (G), a volume of pores having a pore diameter of 2 nm or smaller, determined from a nitrogen adsorption isotherm with a Density Functional Theory method (DFT) per mass is preferably 0.3 mm$^3$/g or less. In this case, a side reaction with the electrolyte is inhibited, and the battery durability is considered to be further improved. The above volume of the graphite particle (G) is more preferably 0.2 mm$^3$/g or less, and particularly preferably 0.1 mm$^3$/g or less. A lower limit of the above volume is not particularly limited and may be under a detection limit, but is preferably 0.005 mm$^3$/g or more.

The above volume of the graphite particle (G) is determined by a known method, from a nitrogen adsorption isotherm of the graphite particle (G) by the DFT method, and may be measured by using, for example, a specific surface area analyzer (autosorb iQ-MP, manufactured by Quantachrome Instruments). In specific, adsorption isotherms corresponding to pore diameters of various pores are calculated in advance with simulation, then an adsorption isotherm of the graphite particle is determined by using nitrogen gas, and the obtained adsorption isotherm is analyzed to overlay with the adsorption isotherms calculated with the simulation. A volume of each pore per mass is calculated by this procedure, and based on the calculated result, the volume of pores having a pore diameter of 2 nm or smaller per mass may be determined.

A BET specific surface area of the graphite particle (G) is preferably 0.3 m$^2$/g or more, and more preferably 0.5 m$^2$/g or more. In this case, it is considered that an edge surface of the graphite crystal on which lithium ions are inserted and removed associated with charging and discharging is exposed to improve load characteristics (rate characteristics). An upper limit of the BET specific surface area of the graphite particle (G) is not particularly limited, but preferably 2 m$^2$/g or less, and more preferably 1.5 m$^2$/g or less, from viewpoints of inhibition of a side reaction with the electrolyte, and the like. The BET specific surface area of the graphite particle (G) is measured by a BET method by using a conventionally known specific surface area analyzer (for example, Macsorb® HM model-1201, manufactured by Mountech Co., Ltd.).

The graphite particle (G) may be produced by, for example: aggregating a crushed product of coke (precursor), as a main raw material, with a predetermined size using a binder; and calcinating the aggregate in this state for graphitizing to be classified. A temperature of the heat treatment is satisfied within a temperature range of a conventional graphitizing treatment, and for example, 1800° C. to 3000° C. In this time, controlling a particle diameter of the precursor after the crushing, a particle diameter of the precursor in the aggregated state, or the like may regulate the internal void ratio within 1 to 5%. A D50 of the precursor after the crushing is preferably, for example, 12 μm to 20 μm. For the crushing of the precursor, a ball mill, a hummer mill, a pin mill, a jet mill, and the like may be used.

The negative electrode mixture layer may contain, as the negative electrode active material, for example: metal lithium; lithium alloys such as lithium-aluminum alloy, lithium-lead alloy, lithium-silicon alloy, and lithium-tin alloy; carbon materials such as a graphite other than the graphite particle having the pore volume of pores with 2 nm or smaller within the above range, coke, and a calcinated product of an organic compound; and metal oxides such as $SnO_2$, SnO, and $TiO_2$, in addition to the graphite particle according to the present embodiment. From viewpoints of inhibition of expansion and contraction of the negative electrode mixture layer during charge-discharge cycles and prevention of breaking a coating formed on the negative electrode active material, a content of the graphite particles according to the present embodiment is preferably 50 mass % or more, and more preferably 75 mass % or more, in a total amount of the negative electrode active material.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

[Charge Capacity and Charging Control]

The non-aqueous electrolyte secondary battery 10 satisfies an N/P ratio of 1.00 to 1.05 where P represents a charge capacity of the positive electrode 11 and N represents a charge capacity of the negative electrode 12. In this case, precipitation of Li on the negative electrode 12 may be inhibited, while the energy density of the battery may be increased. The N/P ratio varies depending on compositions, properties, a mass ratio, or the like of the positive electrode active material and the negative electrode active material. Thus, compositions, properties, a mass ratio, or the like of each active material needs to be regulated to satisfy the N/P ratio by using the composite oxide (Z) and the graphite particle (G).

In the non-aqueous electrolyte secondary battery 10, a maximum amount of change (dQ/dV (cf)) in a battery capacity within a voltage range from a battery voltage of 4.0 V to a charge termination voltage and a maximum amount of change (dQ/dV (cm)) in a battery capacity within a voltage range of a battery voltage from 3.8 V to 4.0 V satisfy the following relation of Formula 1.

$$dQ/dV \text{ (cf)}/dQ/dV \text{ (cm)} \leq 1 \quad \text{[Formula 1]}$$

The dQ/dV means an amount of change in the battery capacity Q per unit voltage, and calculated from a charge curve of the non-aqueous electrolyte secondary battery 10. The battery durability is remarkably improved by: using the composite oxide (Z) as the positive electrode active material, using the graphite particle (G) as the negative electrode active material, regulating the N/P ratio within 1.00 to 1.05, and satisfying the relation of Formula 1.

A charge control, particularly the charge termination voltage, of the non-aqueous electrolyte secondary battery 10 is important for satisfying the relation of Formula 1. The charge termination voltage is not particularly limited as long as the relation of Formula 1 is satisfied, and preferably set to 4.15 V or lower, for example within a range of 4.00 to 4.15 V. An intensity ratio (cf/cm) largely varies depending on compositions, properties, a mass ratio, or the like of the positive electrode active material and the negative electrode active material even when the charge termination voltage is set to 4.15 V or lower. Thus, compositions, properties, a mass ratio, or the like of each active material needs to be regulated to satisfy the relation of Formula 1 by using the composite oxide (Z) and the graphite particle (G).

Figure 2A:
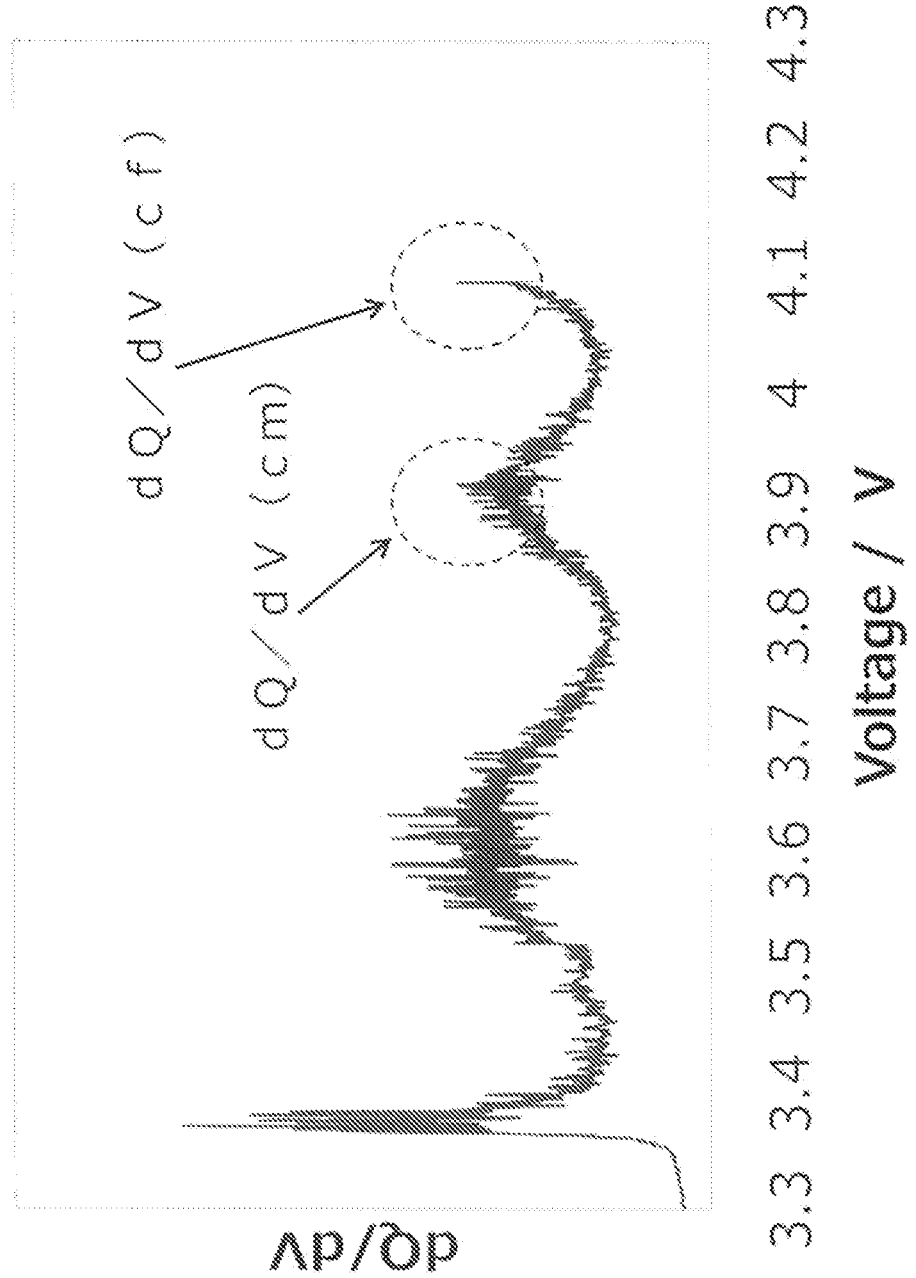
FIG. 2A is a graph indicating a relation between a battery voltage (V) and an amount of change (dQ/dV) in a battery capacity (Q) per unit volume calculated from a 0.05-It charge curve in a non-aqueous electrolyte secondary battery of Example.
Figure 2B:
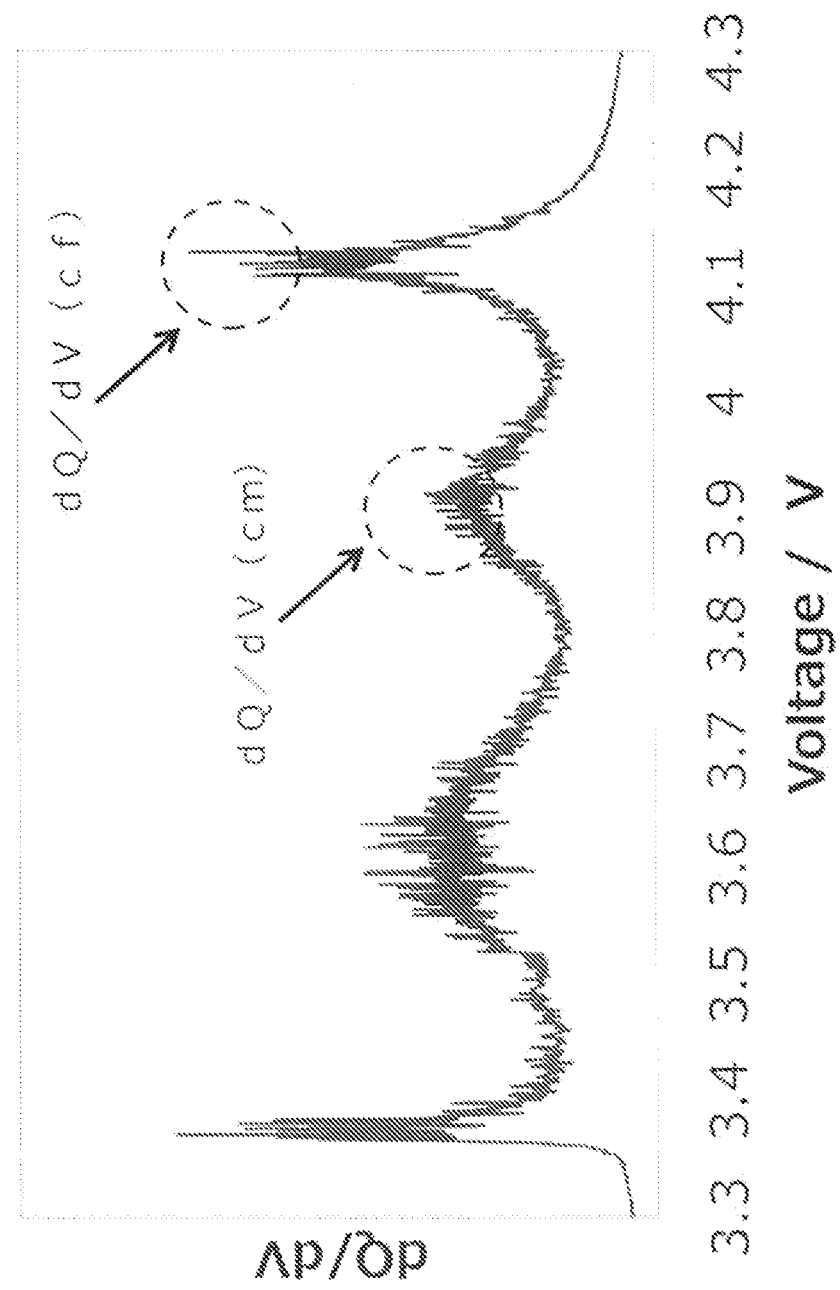
FIG. 2B is a graph indicating a relation between a battery voltage (V) and an amount of change (dQ/dV) in a battery capacity (Q) per unit volume calculated from a 0.05-It charge curve in a non-aqueous electrolyte secondary battery of Comparative Example.

FIGS. 2A and 2B are graphs indicating a relation between a battery voltage (V) and dQ/dV in non-aqueous electrolyte secondary batteries of Example 1 and Comparative Example 2, described later. As indicated in FIGS. 2A and 2B, the non-aqueous electrolyte secondary battery 10 exhibits dQ/dV peaks in, for example, a voltage range of higher than 4.0 V and a voltage range of a battery voltage from 3.8 V to 4.0 V. In this case, a value of a peak top in the voltage range of a battery voltage from 3.8 V to 4.0 V is (dQ/dV (cm)). Thus, (dQ/dV (cf)) becomes equal to or less than (dQ/dV (cm)) to set the charge termination voltage for satisfying the relation of Formula 1.

The non-aqueous electrolyte secondary battery 10 comprising the above constitution constitutes, for example, a battery system with a charging controller configured to control the battery charge. The non-aqueous electrolyte secondary battery 10 is connected to a load to supply a charged electric power to the load. The battery system may comprise an assembled battery (also referred to as a battery pack or a battery module) in which a plurality of the non-aqueous electrolyte secondary batteries 10 is connected in series, parallel, or series-parallel. The charging controller may be integrated in the battery module, or may be configured as a part of a controller of an apparatus or facility such as a vehicle on which the non-aqueous electrolyte secondary battery 10 is mounted.

The charging controller determines a charge condition of the battery based on, for example, a charge state of the battery obtained from a battery monitoring unit. The charging controller may have a rectifier circuit for converting an alternating-current power of a power source into a predetermined direct-current power to supply the power to the non-aqueous electrolyte secondary battery 10. The charging controller is composed of a computer comprising a processor, a memory, an input and output interface, and the like. The processor is composed of, for example, a CPU or a GPU, and reads and executes a processing program to control the charge. The memory includes a non-volatile memory such as a ROM, an HDD, and an SSD, and a volatile memory such as a RAM. The processing program is stored in the non-volatile memory.

The battery system may comprise the battery monitoring unit. The battery monitoring unit detects, for example, a charge current supplied to the non-aqueous electrolyte secondary battery 10 and the battery voltage. The charging controller estimates a charge rate (state of charge: SOC) from the battery voltage obtained by the battery monitoring unit, and controls the charge based on the SOC. The SOC may also be estimated from a charge-discharge current and a charge-discharge time. For an SOC estimation method, conventionally known methods may be used.

EXAMPLES

Hereinafter, the present disclosure will be further described with Examples, but the present disclosure is not limited to these Examples.

Example 1

[Production of Positive Electrode]

A lithium-transition metal composite oxide represented by $LiNi_{0.9}Co_{0.45}Al_{0.45}O_2$ was used as the positive electrode active material. The positive electrode active material, acetylene black, and polyvinylidene fluoride were mixed at a solid-content mass ratio of 98:1:1, and an appropriate amount of N-methyl-2-pyrrolidone (NMP) was added to prepare a positive electrode mixture slurry. This slurry was applied on both surfaces of a positive electrode core made of aluminum foil by a doctor blade method, the applied film was dried, and then the applied film was compressed with a roller and cut to a predetermined electrode size to produce a positive electrode in which the positive electrode mixture layer was formed on both the surfaces of the positive electrode core. An exposed part where a surface of the core was exposed was provided at a part of the positive electrode, and a positive electrode lead made of aluminum was attached to the exposed part.

[Production of Graphite Particle]

Coke and a pitch binder were crushed and mixed, then the mixture was calcinated at 1000° C. and subsequently graphitized at 3000° C. The graphitized product was crushed with a ball mill under a $N_2$ atmosphere, and the obtained powder was classified to obtain graphite particles G1 having D50, measured by the above method, of 16 μm and an internal void ratio of 2%. The graphite particles G1 had a BET specific surface area of 0.5 $m^2/g$ and a volume of pores having a pore diameter of 2 nm or smaller determined with a DFT method per mass, of 0.1 $mm^3/g$.

[Production of Negative Electrode]

The graphite particles G1 were used as the negative electrode active material. The negative electrode active material, carboxymethyl cellulose sodium salt (CMC-Na), and styrene-butadiene rubber (SBR) were mixed at a solid-content mass ratio of 98:1:1 in an aqueous solution to prepare a negative electrode mixture slurry. This slurry was applied on both surfaces of a negative electrode core made of copper foil, the applied film was dried, and then the applied film was compressed with a roller and cut to a predetermined electrode size to produce a negative electrode in which the negative electrode mixture layer was formed on both the surfaces of the negative electrode core. An exposed part where a surface of the negative electrode core was exposed was provided at a part of the negative electrode, and a negative electrode lead made of nickel was attached to the exposed part.

[Preparation of Non-Aqueous Electrolyte]

Into a mixed solvent of ethylene carbonate (EC), methyl ethyl carbonate (MEC), and dimethyl carbonate (DMC) at a volume ratio of 3:3:4. $LiPF_6$ was dissolved at a concentration of 1.2 mol/litter to prepare a non-aqueous electrolyte liquid.

[Production of Non-Aqueous Electrolyte Secondary Battery]

The positive electrode and the negative electrode were spirally wound with a separator made of polyethylene interposed therebetween to produce a wound electrode assembly. Insulating plates were disposed on each of upper and lower sides of the electrode assembly, the negative electrode lead was welded on a bottom inner surface of an exterior housing can, the positive electrode lead was welded on a sealing assembly, and the electrode assembly was housed in the exterior housing can. Thereafter, the non-aqueous electrolyte liquid was injected into the exterior housing can, and then an opening of the exterior housing can was sealed with the sealing assembly and with a gasket interposed therebetween to produce a cylindrical non-aqueous electrolyte secondary battery.

For the non-aqueous electrolyte secondary battery of Example 1, the N/P ratio was set to 1.04, the charge termination voltage was set to 4.1 V, and the intensity ratio (cf/cm) was set to 0.97.

Comparative Example 1

A non-aqueous electrolyte secondary battery was produced in the same manner as in Example 1 except that graphite particles G2 produced by the following method was used instead of the graphite particles G1.

[Production of Graphite Particle]

Coke and a pitch binder were crushed and mixed, then the mixture was calcinated at 1000° C., and subsequently graphitized at 3000° C. The graphitized product was crushed with a roller mill under an inert atmosphere, and the obtained powder was classified to obtain graphite particles G2 having D50 of 17 μm and an internal void ratio of 18%. The graphite particles G2 had a BET specific surface area of 0.3 $m^2/g$ and a volume of pores having a pore diameter of 2 nm or smaller determined with a DFT method per mass, of 1.5 $mm^3/g$.

Comparative Example 2

A non-aqueous electrolyte secondary battery was produced with a constitution same as that in Example 1 except that the N/P ratio was set to 1.04, the charge termination voltage was set to 4.3 V, and the intensity ratio (cf/cm) was set to 1.86.

[Evaluation of Capacity Maintenance Rate after Cycle Test (Durability)]

Each of the batteries of Example and Comparative Examples was charged at a constant current of 0.5 It to the charge termination voltage under a temperature environment of 45° C., and charged at a constant voltage of the charge termination voltage until a current value reached 1/50 It. Then, the battery was discharged at a constant current of 0.5 It until the battery voltage reached 3.0 V. This charge-discharge cycle was repeated 800 times. A discharge capacity at the 1st cycle and a discharge capacity at the 800th cycle in the cycle test were determined, and the capacity maintenance rate was calculated with the following formula. The evaluation results are shown in Table 1 with compositions of the lithium-transition metal composite oxides, the internal void ratios of the graphite particles, and the intensity ratios (cf/cm).

Capacity Maintenance Rate (%)=(Discharge Capacity at 800th Cycle/Discharge Capacity at 1st Cycle)×100

FIGS. 2A and 2B indicate a relation between the battery voltage (V) and an amount of change (dQ/dV) in the battery capacity (Q) per unit volume calculated from a 0.05-It charge curve in each of the batteries of Example 1 and Comparative Example 2.

TABLE I

| | Li-Transition Metal Composite Oxide | | | Graphite Particle Internal | Intensity Ratio | Capacity Maintenance |
|---|---|---|---|---|---|---|
| | Ni | Co | Al | Void ratio | cf/cm | Rate |
| Example 1 | 91 | 4.5 | 4.5 | 2% | 0.97 | 86% |
| Comparative Example 1 | 91 | 4.5 | 4.5 | 18% | 0.97 | 74% |
| Comparative Example 2 | 91 | 4.5 | 4.5 | 2% | 1.86 | 10% |

As can be seen from the results shown in Table 1, the battery of Example has a higher capacity maintenance rate after the cycle test than the batteries of Comparative Examples, and has excellent charge-discharge cycle characteristics (durability). When the graphite particles having an internal void ratio of more than 5% was used (Comparative Example 1), it is difficult to achieve a good durability, and in particular, in the case of an intensity ratio (cf/cm) of more than 1 (Comparative Example 2), the durability significantly deteriorates.

REFERENCE SIGNS LIST

10 Non-aqueous electrolyte secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket

The invention claimed is:

1. A non-aqueous electrolyte secondary battery, comprising:
a positive electrode;
a negative electrode; and
a non-aqueous electrolyte, wherein the positive electrode includes a lithium-transition metal composite oxide containing 85 mol % or more of Ni based on a total number of moles of metal elements excluding Li;

the negative electrode includes graphite particles having an internal void ratio of 1 to 5%;

an N/P ratio is 1.00 to 1.05 where P represents a charge capacity of the positive electrode and N represents a charge capacity of the negative electrode; and a maximum amount of change (dQ/dV (cf)) in a battery capacity (Q) within a voltage range from a battery voltage of 4.0 V to a charge termination voltage and a maximum amount of change (dQ/dV (cm)) in a battery capacity (Q) within a voltage range of a battery voltage from 3.8 V to 4.0 V satisfy the following relation:

$$\frac{dQ/dV(cf)}{dQ/dV(cm)} \leqq 1. \qquad \text{[Formula 1]}$$

2. The non-aqueous electrolyte secondary battery according to claim 1, wherein the graphite particles have a volume of pores having a pore diameter of 2 nm or smaller determined from a nitrogen adsorption isotherm with a DFT method per mass, of 0.3 mm$^3$/g or less.

3. The non-aqueous electrolyte secondary battery according to claim 1, wherein a BET specific surface area of the graphite particles is 0.5 m$^2$/g or more.

4. The non-aqueous electrolyte secondary battery according to claim 1, wherein the charge termination voltage is 4.15 V or lower.

* * * * *